United States Patent
Oku (10) Patent No.: US 9,276,733 B1
(45) Date of Patent: Mar. 1, 2016

(54) SIGNAL REPRODUCTION CIRCUIT, SIGNAL REPRODUCTION SYSTEM, AND SIGNAL REPRODUCTION METHOD

(71) Applicant: FUJITSU LIMITED, Kawasaki-shi, Kanagawa (JP)

(72) Inventor: Hideki Oku, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/816,498

(22) Filed: Aug. 3, 2015

(30) Foreign Application Priority Data

Sep. 25, 2014 (JP) ................................. 2014-195564

(51) Int. Cl.
*H04L 7/00* (2006.01)
*H04L 7/033* (2006.01)

(52) U.S. Cl.
CPC ............ *H04L 7/0337* (2013.01); *H04L 7/0037* (2013.01)

(58) Field of Classification Search
CPC ........................................................ H04L 7/00
See application file for complete search history.

(56) References Cited

U.S. PATENT DOCUMENTS

| 2003/0118137 A1* | 6/2003 | Skinner ................. H04B 15/04 375/355 |
| 2006/0018407 A1 | 1/2006 | Osaka et al. |
| 2009/0225916 A1 | 9/2009 | Ozawa |

FOREIGN PATENT DOCUMENTS

| JP | 2006-041818 | 2/2006 |
| JP | 2007-142748 | 6/2007 |
| JP | 2009-171190 | 7/2009 |

OTHER PUBLICATIONS

M. Rau et al., "Clock/Data Recovery PLL Using Half-Frequency Clock," IEEE Journal of Solid-State Circuits, vol. 32, No. 7, Jul. 1997, pp. 1156-1159 (4 pages).

* cited by examiner

*Primary Examiner* — Jaison Joseph
(74) *Attorney, Agent, or Firm* — Fujitsu Patent Center (57) ABSTRACT

A signal reproduction circuit, includes: a clock reproduction circuit configured to reproduce a reception clock from a reception data signal; a data fetching circuit configured to fetch the reception data signal in response to a variation edge of the reception clock and output the reception data signal as first decision data; and a phase adjustment circuit configured to adjust a phase of the variation edge of the reception clock in response to a plurality of second decision data, the data fetching circuit fetching a plurality of second reception data in a plurality of periods immediately preceding to a period in which the reception data signal is fetched and outputting the plurality of second reception data as the plurality of second decision data.

20 Claims, 10 Drawing Sheets

SIGNAL REPRODUCTION CIRCUIT, SIGNAL REPRODUCTION SYSTEM, AND SIGNAL REPRODUCTION METHOD

CROSS-REFERENCE TO RELATED APPLICATION

This application is based upon and claims the benefit of priority of the prior Japanese Patent Application No. 2014-195564, filed on Sep. 25, 2014, the entire contents of which are incorporated herein by reference.

FIELD

The present embodiment relates to a signal reproduction circuit, a signal reproduction system and a signal reproduction method.

BACKGROUND

There is a tendency that the data rate in transmission and reception of a signal inside and outside an apparatus increases together with enhancement of a performance of an apparatus for a communication backbone or an information processing equipment such as a server.

A related art is disclosed in Japanese Laid-open Patent Publication No. 2006-041818, Japanese Laid-open Patent Publication No. 2007-142748, Japanese Laid-open Patent Publication No. 2009-171190, or Non-Patent Document "Clock/Data Recovery PLL using Half-Frequency Clock," M. Rau, T. Oberst, R. Lares, A. Rothermel, R. Schweer, and N. Menoux IEEE JOURNAL OF SOLID-STATE CIRCUITS, VOL. 32, NO. 7, JULY 1997.

SUMMARY

According to an aspect of the embodiment, a signal reproduction circuit, includes: a clock reproduction circuit configured to reproduce a reception clock from a reception data signal; a data fetching circuit configured to fetch the reception data signal in response to a variation edge of the reception clock and output the reception data signal as first decision data; and a phase adjustment circuit configured to adjust a phase of the variation edge of the reception clock in response to a plurality of second decision data, the data fetching circuit fetching a plurality of second reception data in a plurality of periods immediately preceding to a period in which the reception data signal is fetched and outputting the plurality of second reception data as the plurality of second decision data. The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

In a communication system in which transmission and reception of a data signal are performed, a data fetching circuit of a signal reproduction circuit, for example, a comparison circuit fetches a transmitted data signal in response to a reception clock to perform signal reproduction. As the reception clock, a clock reproduced by a clock and data recovery (CDR) circuit from the reception data signal may be used.

In the signal reproduction circuit, the data fetching circuit (comparison circuit) fetches a reception data signal in response to a reception clock reproduced by the CDR circuit to perform signal reproduction. Since jitters in a phase direction are removed by fetching the reception data signal in response to the reception clock, the signal reproduction may be referred to sometime as retime. In the retime, sampling (fetching) in response to the reception clock that rises at the center of a variation edge of the reception data signal, for example, with a phase displaced by 180 degrees from a variation edge, is performed to definitely determine whether the reception data is "0" or "1."

If the data rate becomes high, for example, if the ratio of the variation time period (through rate) of a signal with respect to 1 unit interval (1UI) increases, the reception data signal generated by the signal reproduction circuit may start next transition before variation to a maximum amplitude occurs within a unit of one clock (1UI). For example, when the data value (sign) of the reception data signal repeats "01 . . . 01," the reception data signal repeats variation with a small amplitude. Therefore, after the reception data signal starts transition from a small amplitude and changes to an inverse small amplitude through an intermediate level, the reception data signal starts transition again. For example, when the data value of the reception data signal transits like "0 . . . 01 . . . 1," the reception data signal starts its transition from one of maximum amplitudes and then varies to the other one of maximum amplitudes through an intermediate level.

In this manner, the level with which transition is started differs depending upon the preceding data value, and, if the level with which transition is started is different, the time period until the intermediate level is passed is different depending upon the level. Depending upon a preceding data value, the reception data signal may not sufficiently reach a state corresponding to a data value at the phase of 180 degrees of 1UI. In a signal reproduction circuit having a high data rate, the optimum timing for fetching of the reception data signal may vary in response to the preceding data value.

For example, in the signal reproduction circuit, retime is performed on the basis of a reception clock that rises with a phase displaced by 180 degrees from a variation edge of the reception data signal regardless of data to be received. Since a CDR circuit reproduces a reception clock by controlling a phase locked loop (PLL) circuit so as to reduce a phase difference from a variation edge of the reception data signal, the phase may not be adjusted for each period of the reception clock. Therefore, a timing optimum for fetching of the reception data signal and a timing of a reception clock reproduced by the CDR circuit may not coincide with each other and a reception error may occur.

For example, a signal reproduction circuit may be provided by which a reception clock reproduced by the CDR circuit provides a timing suitable for fetching of the reception data signal.

Figure 1:
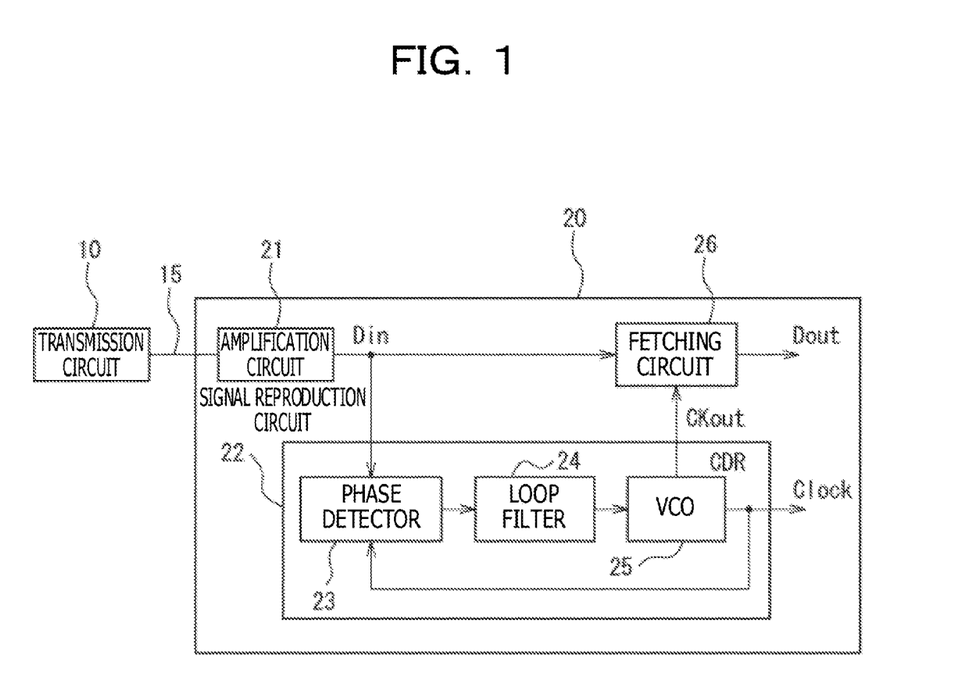
FIG. 1 is a block diagram depicting an example of a communication system.

FIG. 1 is a block diagram depicting an example of a communication system. The communication system includes a transmission circuit 10, a signal reproduction circuit 20, and a transmission line 15 for transmitting a signal output from the transmission circuit 10 to the signal reproduction circuit 20. The communication system may perform any communication such as communication between apparatuses, communication between substrates in an apparatus, communication between devices in a substrate, and communication between blocks in a device. The communication system may be an optical communication system. The transmission line 15 may include an optical cable, a transmission cable, a wiring line on a substrate, a wiring line in a device or the like in accordance with a mode of the communication system.

The signal reproduction circuit 20 includes an amplification circuit 21, a clock data recovery (CDR) circuit 22, and a fetching circuit (D-type flip-flop (D-FF)) 26. The amplification circuit 24 amplifies a signal from the transmission line 15 and outputs a stabilized reception data signal Din suitable for processing at a following stage.

The clock data recovery (CDR) circuit 22 includes a phase detector 23, a loop filter 24, and a voltage control oscillator (VCO) 25. The CDR circuit 22 reproduces a clock included in the reception data signal, for example, a transmission clock, from a variation of the reception data signal Din and then outputs the resulting reproduction clock as a reproduction clock Clock and outputs a reception clock CKout having a phase displaced by 180 degrees from a phase of a reproduction clock.

The fetching circuit 26 may be a comparison circuit and may be a D-FF circuit. The fetching circuit 26 performs sampling (fetching) of the reception data signal Din, for example, retime, at a timing of a rising edge of the reception clock CKout and determines whether the reception data signal has the value of "0" or "1." The fetching circuit 26 outputs the determined value as output (decision) data Dout.

Figure 2A:
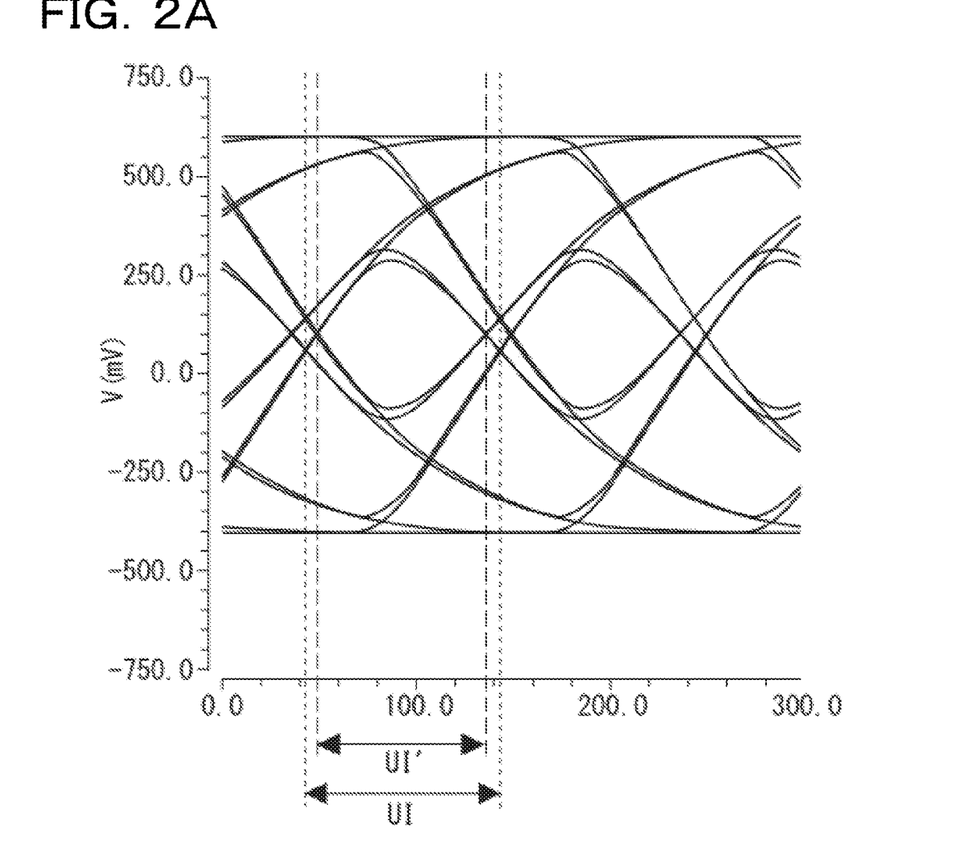
FIGS. 2A and 2B are views depicting an example of a signal waveform of a reception data signal.
Figure 2B:
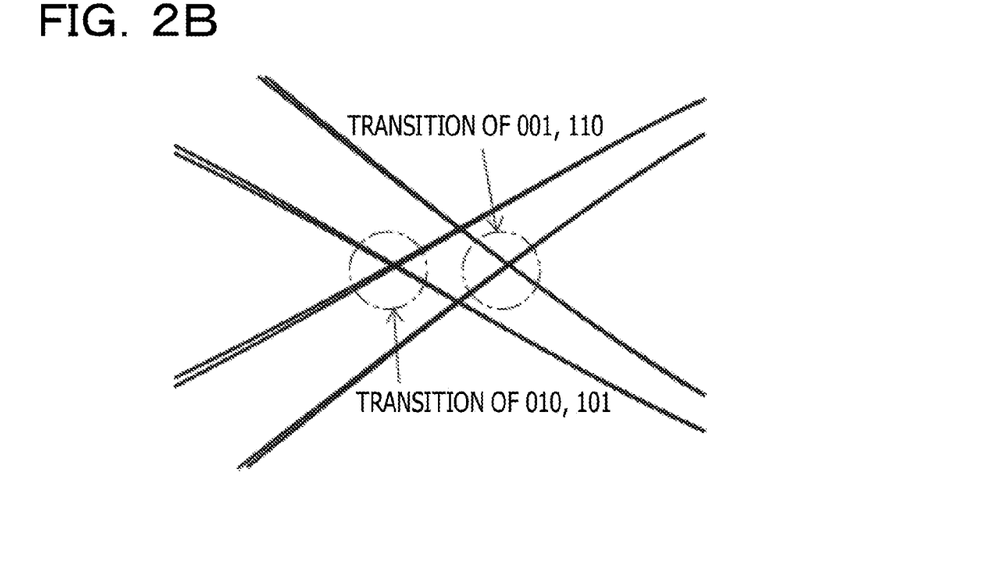

FIGS. 2A and 2B are views depicting an example of a signal waveform of a reception data signal. FIG. 2A depicts an overall waveform of the reception data signal Din and FIG. 2B depicts an enlarged view of the reception data signal Din at an intermediate level, for example, in the proximity of 0 V.

FIGS. 2A and 2B depict a signal waveform referred to as eye pattern. In FIG. 2A, UI indicates one period of a reproduced clock Clock. For example, the CDR circuit 22 depicted in FIG. 1 detects a phase at a zero-cross portion of the reception data signal Din and reproduces the clock Clock such that the zero-cross portion becomes 0 degrees (or 360 degrees) of the UI.

As depicted in FIG. 2A, in the reception data signal Din, a displacement occurs in a phase at the zero-cross portion in accordance with the amplitude within a preceding period. As depicted in FIG. 2B, the zero-cross timing is different between first cases including a case in which the data value in two immediately preceding periods is "01" and then transits to "0" and another case in which the data value in two immediately preceding periods is "10" and then transits to "1" and second cases including a case in which the data value in two immediately preceding periods is "00" and then transits to "1" and another case in which the data value in two immediately preceding periods is "11" and then transits to "0." For example, the timing of zero-crossing upon transition to a different value after successive appearances of a same value, for example, upon transition from "00" to "1" and upon transition from "11" to "0," may become later than the timing upon transition to a different value after successive appearances of different values, for example, upon transition from "01" to "0" and upon transition from "10" to "1."

Therefore, as depicted in FIG. 2A, when the reception data signal Din transits from "00" to "1" and further transits to "0" and when the reception data signal Din transits from "11" to "0" and then transits to "1," the time difference between zero-cross points adjacent to each other is "UI'" that is smaller than 1UI. An eye pattern opening may be narrowed in a time axis direction, for example, may be degraded, by inter-sign interference of the reception data signal.

Figure 3:
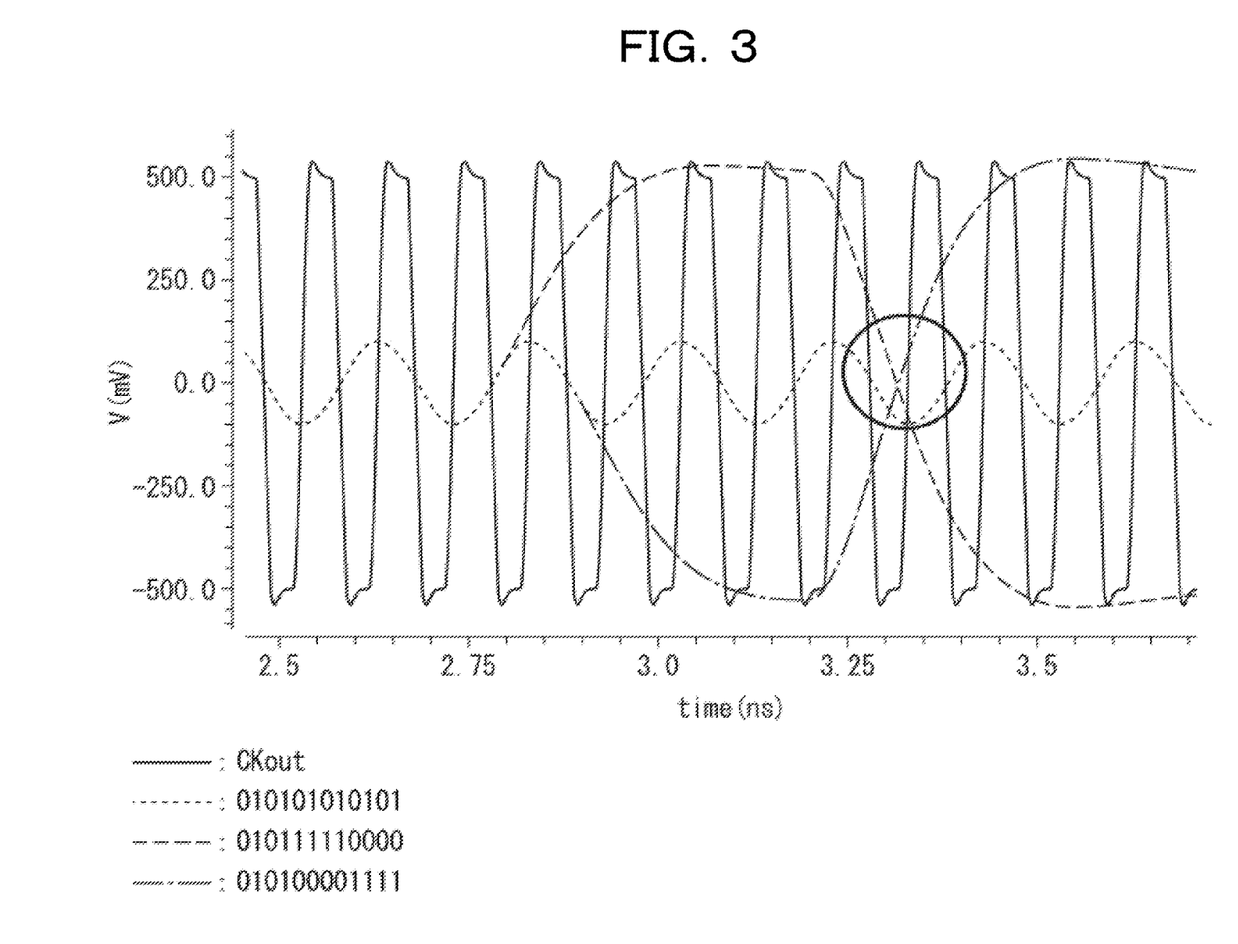
FIG. 3 is a view depicting an example of a signal waveform of a signal reproduction circuit.

FIG. 3 is a view depicting an example of a signal waveform of a signal reproduction circuit. Referring to FIG. 3, a solid line curve indicates a reception clock CKout reproduced by the CDR circuit 22. A dotted line curve indicates a reception data signal when the data is "01 . . . 01." A broken line curve indicates the reception data signal when the data is "010111110000." An alternate long and short dash line curve indicates the reception data signal when the data is "010100001111."

It is preferable that, at a falling edge of the reception clock CKout, the reception data signal zero-crosses, and at a rising edge of the reception clock CKout, the reception data signal is in a stable state. As indicated by a range defined by a circle of a two-dot chain line, the reception data signal when the data is "01 . . . 01" zero-crosses at a falling edge of the reception clock CKout and has a negative stable value at a rising edge of the reception clock CKout. The reception data signals when the data is "010111110000" and the "010100001111" do not zero-cross at a falling edge of the reception clock CKout and have a zero-cross timing that approaches a rising edge of the reception clock CKout. Therefore, at a timing of a rising edge of the reception clock CKout, the reception data signal is on the way to change to "0" or "1" and is not stable. Therefore, if the data is fetched at this timing, an error may possibly occur.

When the data value transits from a state in which the same sign successively appears, a variation of the reception data signal may be delayed. Therefore, the margin in a time direction may be lost, and the transmission quality may be deteriorated and, for example, the error rate may increase.

For example, in the signal reproduction circuit, a variation edge of the reception clock may be adjusted appropriately in response to a variation of the reception data signal and the error occurrence may be reduced.

Figure 4:
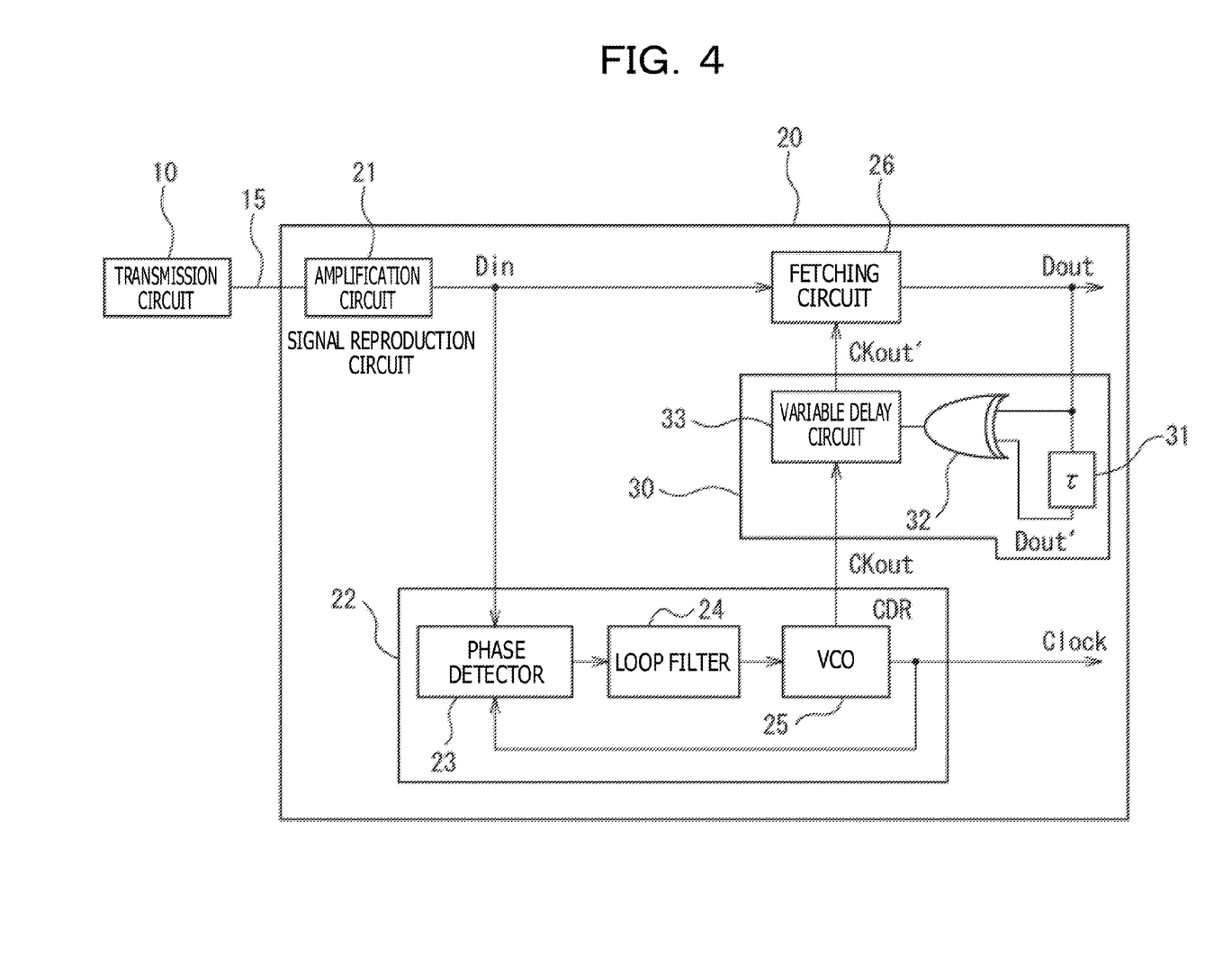
FIG. 4 is a block diagram depicting an example of a communication system.

FIG. 4 is a block diagram depicting an example of a communication system. The communication system depicted in FIG. 4 includes a transmission circuit 10, a signal reproduction circuit 20, and a transmission line 15. The signal reproduction circuit 20 includes an amplification circuit 21, a clock data recovery (CDR) circuit 22, a fetching circuit 26, and a phase adjustment circuit 30. The communication system and the signal reproduction circuit depicted in FIG. 4 are configured such that the phase adjustment circuit 30 is additionally provided in the configuration of the communication system and the signal reproduction circuit of FIG. 1. The configuration of the other part depicted in FIG. 4 may be substantially same as or similar to the configuration depicted in FIG. 1.

The phase adjustment circuit 30 includes a delay circuit (T) 31, an exclusive OR (EXOR) circuit 32, and a variable delay circuit 33. The delay circuit (T) 31 Delays Reception (Decision) Data Dout Output from the Fetching Circuit 26 by one period (1UI) of the reception clock. The EXOR circuit 32 decides whether or not the reception data Dout output from the fetching circuit 26 and reception data Dout' output from the delay circuit 31 and delayed by one period from the reception data Dout coincide with each other. The variable delay circuit 33 changes the phase of a variation edge of the reception clock CKout in response to an output of the EXOR circuit 32. For example, when the output of the EXOR circuit 32 is "0," the variable delay circuit 33 delays the phase of the variation edge of the reception clock CKout. However, when the output of the EXOR circuit 32 is "1," the variable delay circuit 33 maintains the phase of the variation edge of the reception clock CKout.

The fetching circuit 26 fetches a reception data signal Din in response to the reception clock CKout output from the phase adjustment circuit 30, for example, the variable delay circuit 33 and adjusted in phase of the variation edge.

Figure 5A:
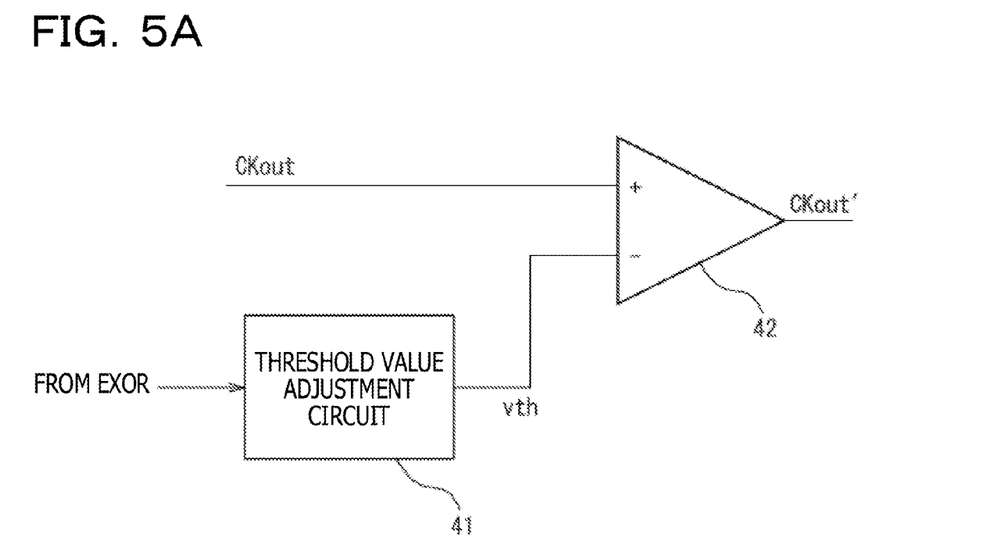
FIG. 5A is a view depicting an example of a variable delay circuit.
Figure 5B:
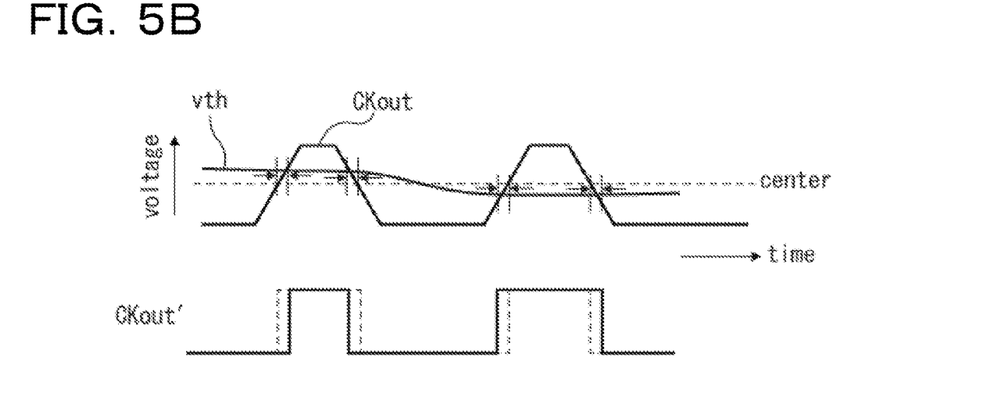
FIG. 5B is a view depicting an example of a time chart of an operation of a variable delay circuit.

FIG. 5A is a view depicting an example of a variable delay circuit. FIG. 5B is a view depicting an example of a time chart of an operation of a variable delay circuit. The variable delay circuit depicted in FIG. 5A may be the variable delay circuit 33 depicted in FIG. 4. As depicted in FIG. 5A, the variable delay circuit 33 includes a threshold value adjustment circuit 41, and a differential amplification circuit (limiting amplifier) 42. The threshold value adjustment circuit 41 varies the level of a threshold value signal Vth to be output in response to an output of the EXOR circuit 32. The threshold value adjustment circuit 41 may include two potential generation circuits that generate, for example, two different threshold value levels and a selection circuit that selects one of outputs of the two potential generation circuits in response to an output of the EXOR circuit 32. The differential amplification circuit 42 amplifies the difference between the reception clock CKout and the threshold value signal Vth output from the threshold value adjustment circuit 41 and outputs a resulting signal CKout'.

The reception clock CKout varies as depicted in FIG. 5B. Where the threshold value signal Vth indicates a center level (center), the signal CKout' varies as indicated by a broken line on the lower side in FIG. 5B. If the output of the EXOR circuit 32 is "0" and the threshold value signal Vth becomes higher than the center level, the signal CKout' becomes narrow and changes to a pulse of a low duty. For example, a rising edge of the signal CKout' becomes later than a rising edge of the signal CKout' when the threshold value signal Vth indicates the center level. If the output of the EXOR circuit 32 is "1" and the threshold value signal Vth becomes lower than the center level, the signal CKout' becomes greater in width and the waveform changes to a pulse of a high duty. For example, a rising edge of the signal CKout' is hastened from a rising edge of the signal CKout' when the threshold value signal Vth indicates the center level. The variable delay circuit 33 varies the phase of a rising edge of the reception clock CKout. The threshold value adjustment circuit 41 may output the threshold value signal Vth of the center level (center) when the output of the EXOR circuit 32 is "1" and may output the threshold value signal Vth that has a level higher than the center level (center) when the output of the EXOR circuit 32 is "1."

Figure 6:
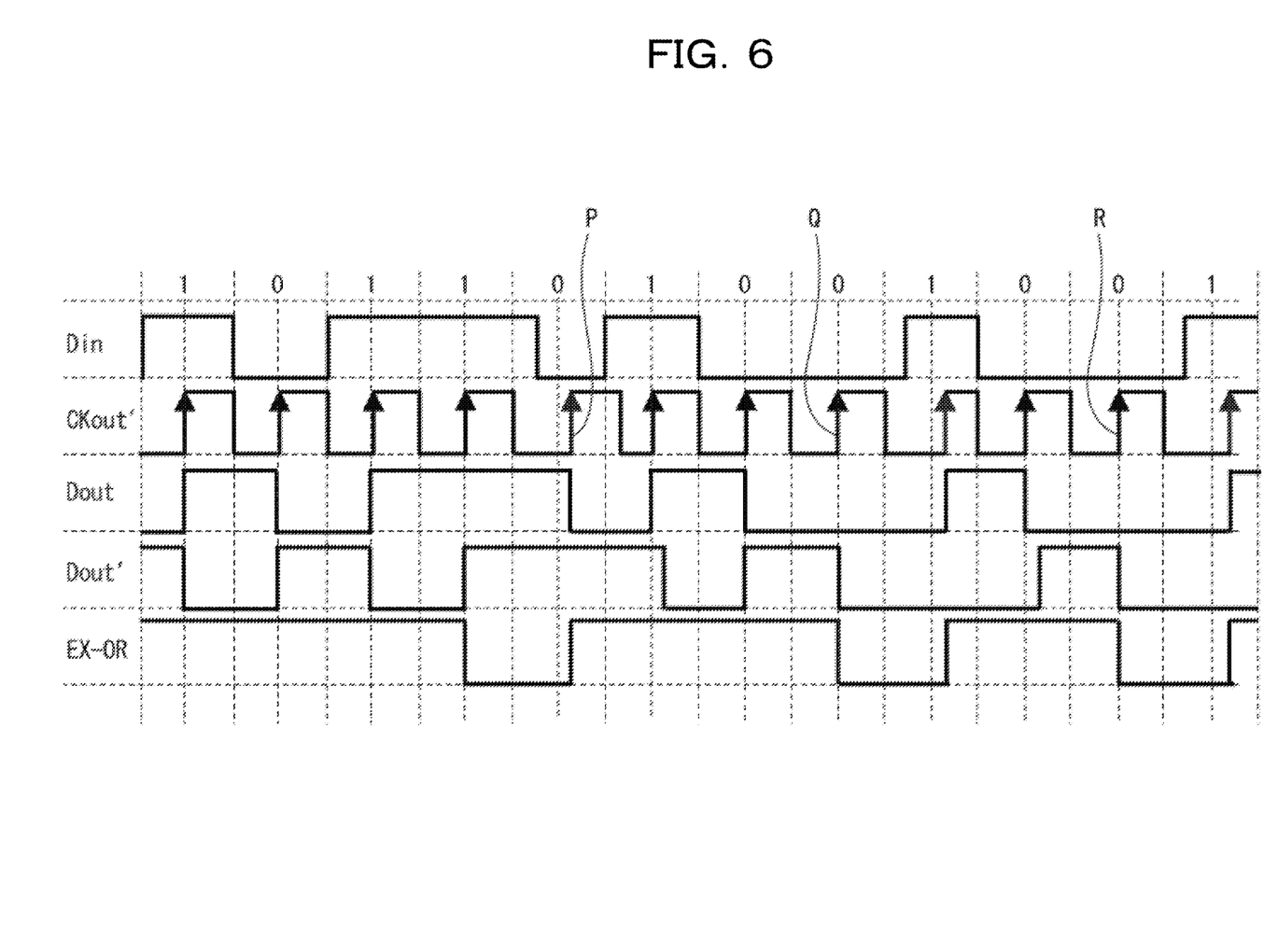
FIG. 6 is a view depicting an example of a time chart of operation of a signal reproduction circuit.

FIG. 6 is a view depicting an example of a time chart of operation of a signal reproduction circuit. In FIG. 6, operation of the signal reproduction circuit depicted in FIG. 4 is depicted. In FIG. 6, a time chart indicative of operation of the signal reproduction circuit when the reception data value transits after reception data values of the same sign successively appear and the variation of the reception data signal is delayed is depicted. In FIG. 6, the reception data signal Din is depicted in a binary digitized form.

In FIG. 6, the reception data signal Din varies like "101101001001." Except a portion, the signal CKout' rises at the center phase (180 degrees) of one period (UI) of the reception data signal Din, and the reception data Dout and the reception data Dout' vary as depicted in FIG. 6. Therefore, the output of the EXOR circuit 32 indicates "0" within intervals from the fourth period to the fifth period, from the eighth period to the ninth period, and the eleventh period to the twelfth period, and it indicates "1" within the other intervals. The variable delay circuit 33 delays the reception clock CKout when the output of the EXOR circuit 32 indicates "0." When the next reception data signal Din is fetched after the reception data signal Din indicates "11" or "00," the rising edges of the signal CKout' denoted by P, Q, and R are delayed, and the signal CKout' rises at a timing in the proximity of the middle of the period in which the next reception data signal Din is indicated, for example, at a most stabilized timing. Therefore, occurrence of the error may be reduced.

For example, if the reception data value transits after reception data values of the same sign appear successively, the variation of the reception data signal may be delayed. Depending upon the communication system, if the reception data value transits after reception data values of the same sign appear successively, conversely the variation of the reception data signal may be hastened.

Figure 7:
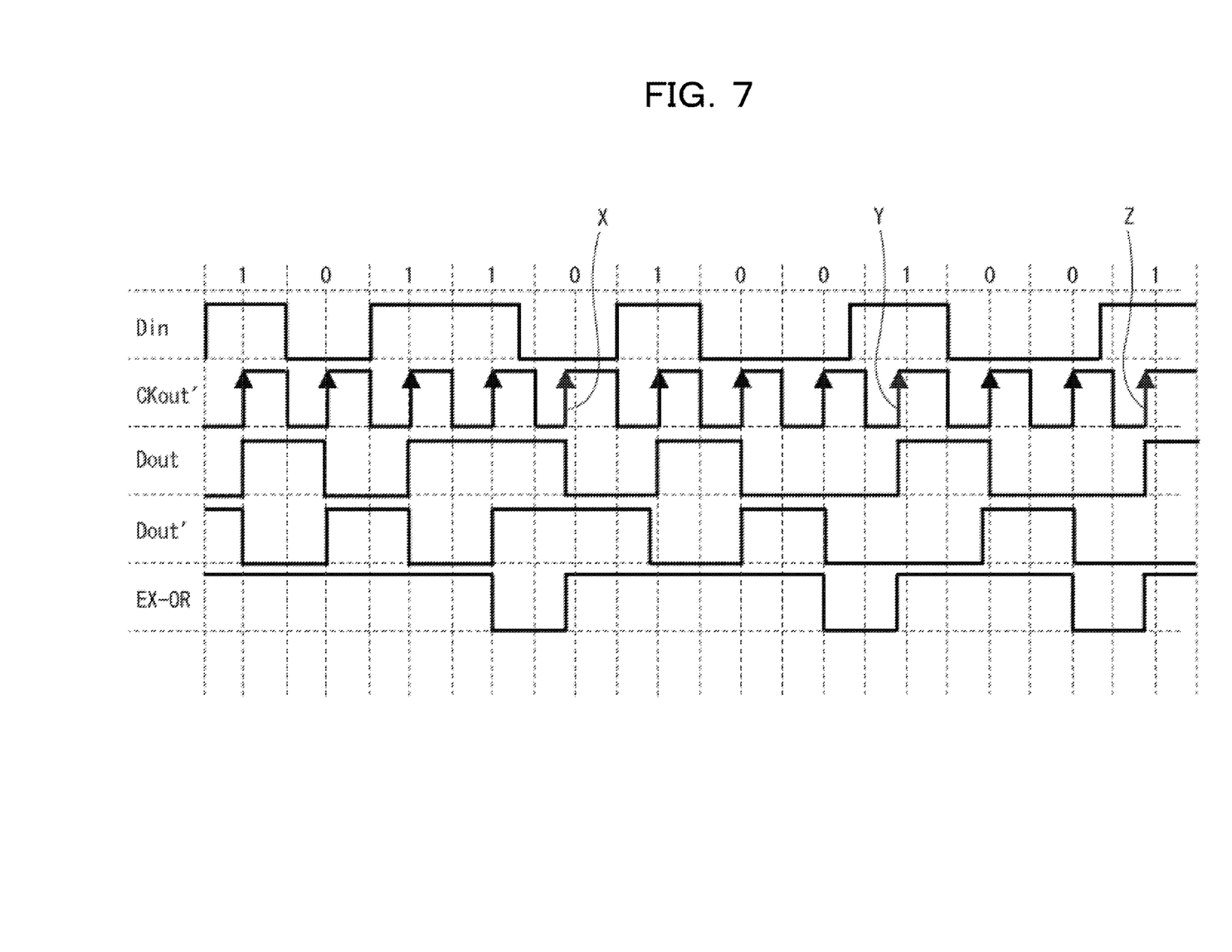
FIG. 7 is a view depicting an example of a time chart of operation of a signal reproduction circuit.

FIG. 7 is a view depicting an example of a time chart of operation of a signal reproduction circuit. In FIG. 7, a time chart indicating operation of the signal reproduction circuit when the reception data value transits after reception data values of the same sign appear successively and the variation of the reception data signal is hastened is depicted. In FIG. 7, the reception data signal Din is depicted in a binary digitized form.

In FIG. 7, the reception data signal Din varies like "101101001001." The output of the EXOR circuit 32 indicates "0" within periods from the fourth period to the fifth period, from the eighth period to the ninth period, and from the eleventh period to the twelfth period, and it indicates "1" within the other periods. The variable delay circuit 33 hastens the reception clock CKout when the output of the EXOR circuit 32 is "0." When the next reception data signal Din is fetched after the reception data signal Din indicates "11" or "00," the rising edges of the signal CKout' denoted by X, Y, and Z are hastened and the signal CKout' rises at a timing in the proximity of the middle of the period in which the next reception data signal Din is indicated, for example, at a most stabilized timing. Therefore, occurrence of the error may be reduced. As the threshold value adjustment circuit 41 outputs a level lower than the center level (center), a rising edge of the reception clock CKout is hastened.

Figure 8:
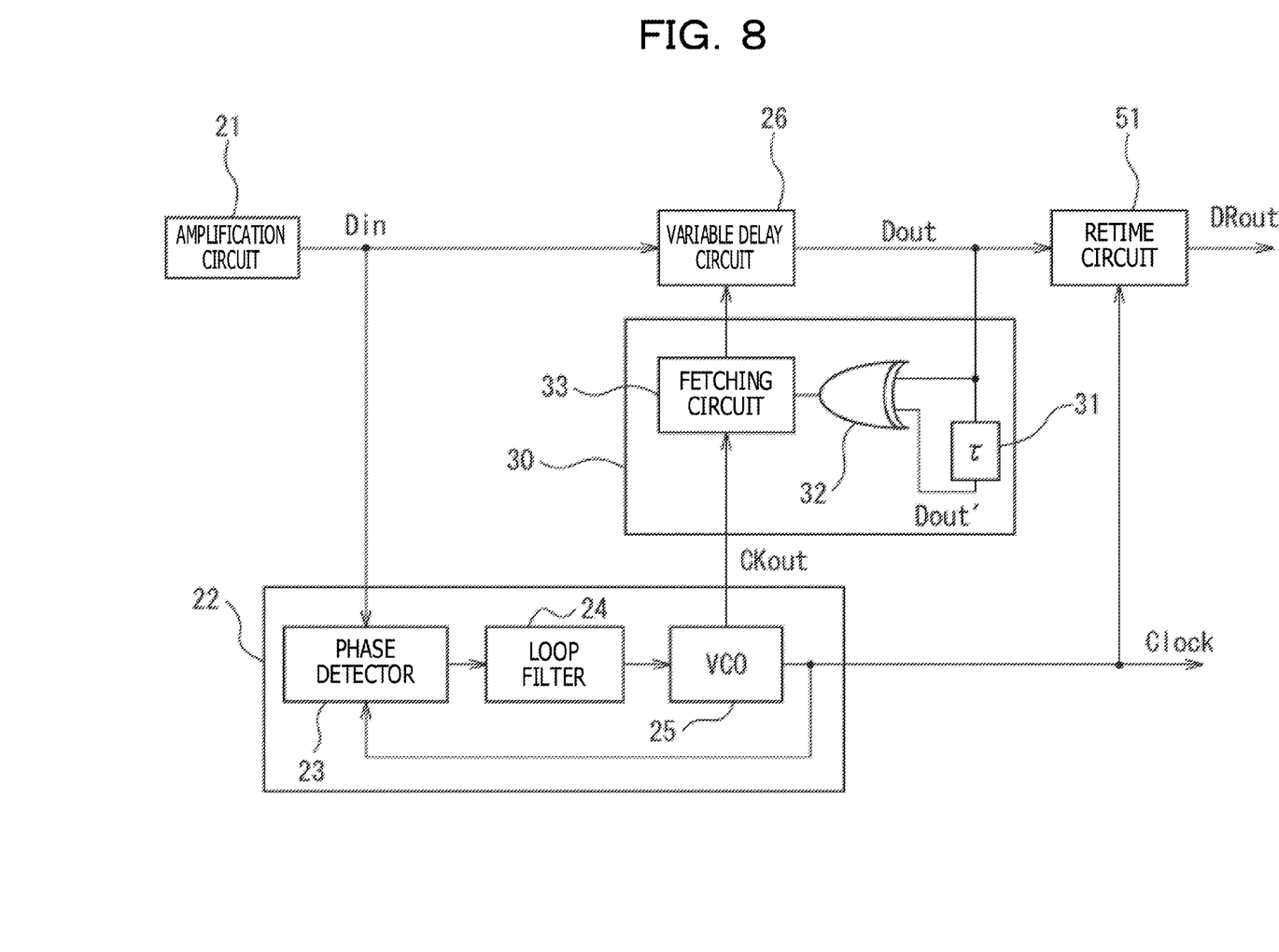
FIG. 8 is a block diagram depicting an example of a signal reproduction circuit.

FIG. 8 is a block diagram depicting an example of a signal reproduction circuit. The signal reproduction circuit depicted in FIG. 8 may be adopted in the communication system depicted in FIG. 4. The signal reproduction circuit depicted in FIG. 8 is configured such that a retime circuit 51 is additionally provided in the signal reproduction circuit depicted in FIG. 4. In FIG. 8, the other components may be substantially same as or similar to the components depicted in FIG. 4, and overlapping description of the other components is omitted herein to avoid redundancy or reduced.

The retime circuit 51 may be a comparison circuit similarly to the fetching circuit 26 and may include a D-type flip-flop (D-FF). The retime circuit 51 samples (fetches) reception data Dout output from the fetching circuit 26 at a timing of a clock Clock output from the CDR circuit and outputs the sampled reception data Dout as a signal DRout. The clock Clock may be a signal of a fixed period. The signal DRout is a signal that varies in response to a clock of a fixed period. The clock Clock may be a signal displaced by 180 degrees in phase from the reception clock CKout.

Figure 9:
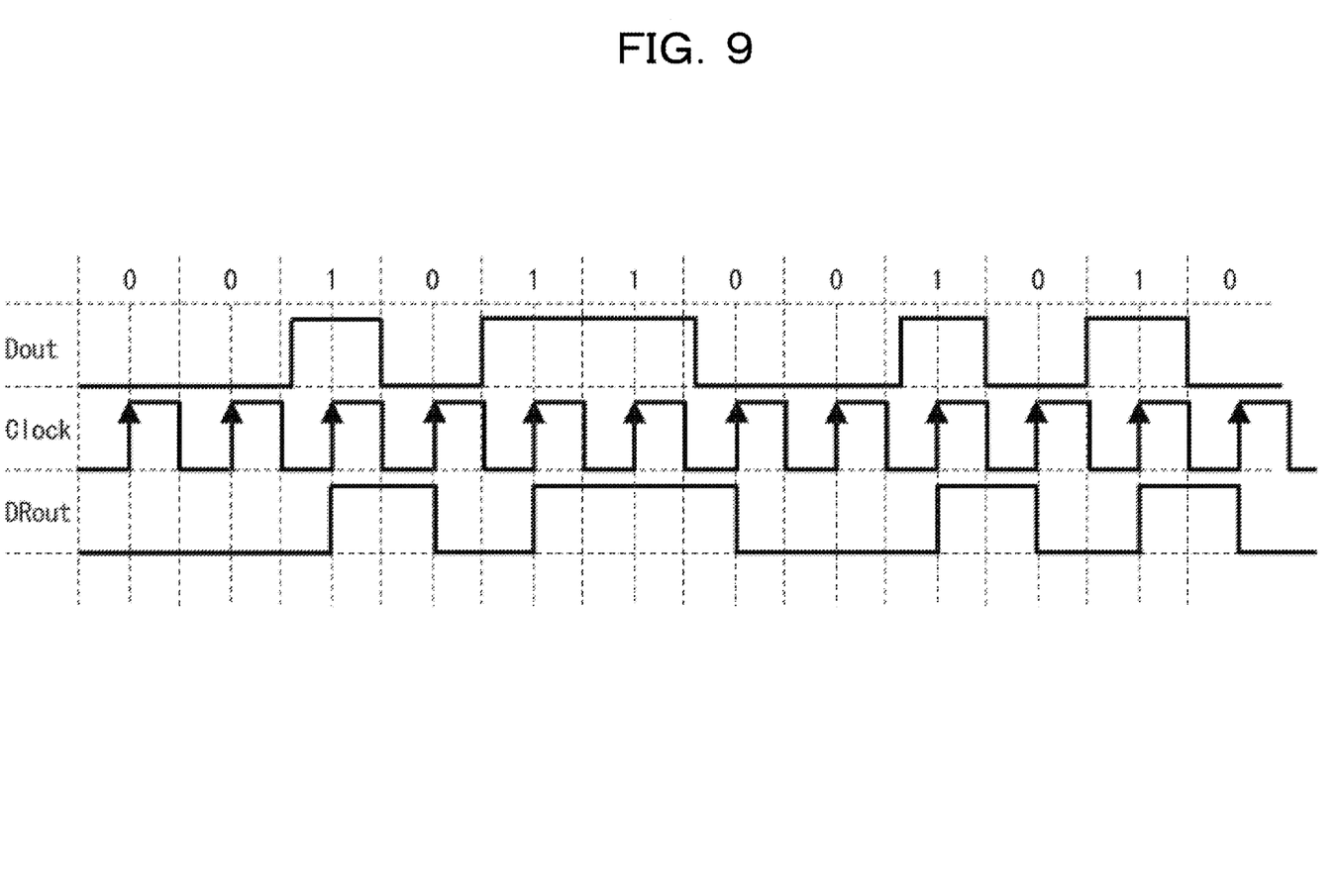
FIG. 9 is a view depicting an example of a time chart of operation of a signal reproduction circuit.

FIG. 9 is a view depicting an example of a time chart of operation of a signal reproduction circuit. In FIG. 9, operation of the signal reproduction circuit depicted in FIG. 8 is depicted. As depicted in FIG. 9, if reception data transits after "00" or "11," the variation edge of the signal CKout' is delayed, and therefore, a delay appears also with a variation edge of the reception data Dout and jitters may appear. The clock Clock is displaced by 180 degrees in phase from the signal CKout' and is displaced by 180 degrees in phase also from the reception data Dout. Therefore, when the clock Clock rises, the reception data Dout is in a stable state, and the retime circuit 51 fetches the reception data Dout stably and outputs the fetched reception data Dout as the signal DRout. The clock Clock may be a clock signal of a substantially fixed period free from jitters and also the signal DRout may be a signal free from jitters.

For example, when immediately preceding two periods (two bits) have the same sign, the reception clock CKout may be delayed and, also when immediately preceding three periods (three bits) or more have the same sign, the delay amount of the reception clock CKout may be substantially fixed. For example, if the data rate becomes higher, the amplitude of the reception data signal before a transition may become different between that when immediately preceding two periods (two bits) have the same sign and that when immediately preceding three periods (three bits) have the same sign. In such a case as just described, it is desirable to increase the delay amount of the reception clock CKout as the number of immediately preceding periods (bits) that exhibit the same sign increases. For example, the signal reproduction circuit may vary the delay amount of the reception clock CKout in response to the number of immediately preceding periods (bits) that successively exhibit the same sign.

Figure 10:
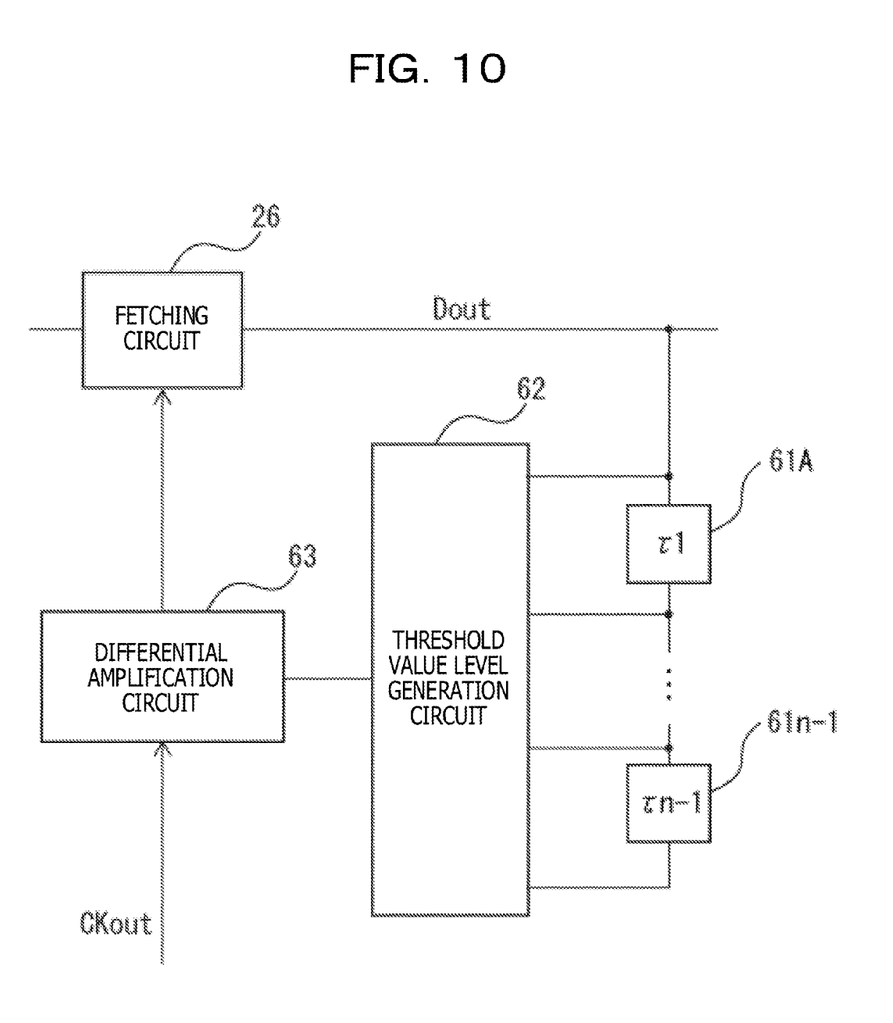
FIG. 10 is a block diagram depicting an example of a phase adjustment circuit.

FIG. 10 is a block diagram depicting an example of a phase adjustment circuit. The phase adjustment circuit depicted in FIG. 10 may be used, for example, as the phase adjustment circuit 30 of the signal reproduction circuit depicted in FIG. 4.

The phase adjustment circuit includes n−1 delay circuits 61A to 61n−1, a threshold value level generation circuit 62, and a differential amplification circuit 63. The delay circuits 61A to 61n−1 successively delay the reception data Dout by one period (1UI) of the clock Clock. Therefore, the output of the delay circuit 61n−1 represents data of the reception data Dout preceding by n periods. The value n may be an integer of three or more, and may be set suitably in accordance with a characteristic of the communication system.

The threshold value level generation circuit 62 determines from the reception data Dout and the data signals obtained by successively delaying the reception data Dout by one period up to the n periods by what periods a same sign successively appears till the immediately preceding period. Then, the threshold value level generation circuit 62 generates a threshold level corresponding to the successive period number. For example, the threshold value level generation circuit 62 may have the functions of the EXOR circuit 32 and the threshold value adjustment circuit 41 depicted in FIG. 4.

For example, if the reception data Dout in the immediately preceding period and the reception data Dout in a second immediately preceding period (output of the delay circuit 61A) are different from each other, since the reception data Dout in the two immediately preceding periods indicate signs different from each other, the threshold value level generation circuit 62 generates a first (reference) level threshold value. If, although the reception data Dout in the two immediately preceding periods indicate the same sign, the reception data Dout in the second immediately preceding period (output of the delay circuit 61A) and the reception data Dout in the third immediately preceding period (output of the delay circuit 61B) are different from each other, the threshold value level generation circuit 62 generates a second level threshold value that is higher than the first level threshold value. If, although the reception data Dout in the three immediately preceding periods indicate the same sign, the reception data Dout in the fourth immediately preceding period (output of the delay circuit 61C) is different in sign, then the threshold value level generation circuit 62 generates a third level threshold value that is higher than the second level threshold value. Such determination regarding identity in sign is performed for periods up to the nth immediately preceding period, and the threshold value level may be set to a successively high value in accordance with the number of periods (bits) in which the same sign successively appears.

The differential amplification circuit 63 may be substantially the same as or similar to the differential amplification circuit 42 depicted in FIG. 5.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. A signal reproduction circuit, comprising:
   a clock reproduction circuit configured to reproduce a reception clock from a reception data signal;
   a data fetching circuit configured to fetch the reception data signal in response to a variation edge of the reception clock and output the reception data signal as first decision data; and
   a phase adjustment circuit configured to adjust a phase of the variation edge of the reception clock in response to a plurality of second decision data, the data fetching circuit fetching a plurality of second reception data in a plurality of periods immediately preceding to a period in which the reception data signal is fetched and outputting the plurality of second reception data as the plurality of second decision data.

2. The signal reproduction circuit according to claim 1, wherein the phase adjustment circuit delays the variation edge of the reception clock when the plurality of periods are two periods and the plurality of second decision data have values equal to each other.

3. The signal reproduction circuit according to claim 2, wherein the phase adjustment circuit further delays the variation edge of the reception clock when the plurality of periods are three periods and the plurality of second decision data have values equal to each other.

4. The signal reproduction circuit according to claim 1, wherein the phase adjustment circuit maintains the variation edge of the reception clock when the plurality of periods are two periods and the plurality of second decision data have values different from each other.

5. The signal reproduction circuit according to claim 1, wherein the phase adjustment circuit includes:
a delay circuit configured to delay one of the plurality of second decision data by one or more periods of the reception clock and output resulting data as delay data; and
a decision circuit configured to decide whether or not the delay data and another one of the plurality of second decision data coincide with each other.

6. The signal reproduction circuit according to claim 5, wherein the decision circuit is an exclusive-OR circuit; and the phase adjustment circuit includes a variable delay circuit configured to vary a phase of the variation edge of the reception clock in response to an output of the exclusive-OR circuit.

7. The signal reproduction circuit according to claim 6, wherein the variable delay circuit includes a duty variation circuit.

8. The signal reproduction circuit according to claim 7, wherein the duty variation circuit includes:
a threshold value adjustment circuit configured to vary an output level in response to the output of the exclusive-OR circuit; and
a differential amplification circuit configured to compare the reception clock and an output of the threshold value adjustment circuit with each other.

9. The signal reproduction circuit according to claim 1, further comprising:
a retime circuit configured to fetch the first decision data in response to a clock having an inverse phase to a phase of the reception clock.

10. The signal reproduction circuit according to claim 1, wherein the phase adjustment circuit includes:
a plurality of delay circuits configured to delay the first decision data by one or more periods of the reception clock;
a threshold value level generation circuit configured to decide identity of signs of a plurality of delay data individually output from the plurality of delay circuits and output a signal corresponding to a result of a decision; and
a differential amplification circuit configured to compare the reception clock and an output of the threshold value level generation circuit with each other.

11. A signal reproduction system, comprising:
a signal reproduction circuit configured to reproduce a reception clock from a data signal transmitted from a transmission circuit and process the data signal further transmitted from the transmission circuit based on the reception clock,
wherein the signal reproduction circuit:
fetches the data signal in response to a variation edge of the reception clock to acquire first decision data;
fetches the data signal in response to the variation edge of the reception clock in a plurality of periods immediately before the data signal is fetched to acquire a plurality of second decision data;
decides whether the plurality of second decision data are different from each other; and
adjusts a phase of the variation edge of the reception clock based on a result of a decision.

12. The signal reproduction system according to claim 11, wherein the variation edge of the reception clock is delayed when the plurality of periods are two periods and the plurality of second decision data have values equal to each other.

13. The signal reproduction system according to claim 12, wherein the phase adjustment circuit further delays the variation edge of the reception clock when the plurality of periods are three periods and the plurality of second decision data have values equal to each other.

14. The signal reproduction system according to claim 11, wherein the variation edge of the reception clock is maintained when the plurality of periods are two periods and the plurality of second decision data have values different from each other.

15. The signal reproduction system according to claim 11, wherein the signal reproduction circuit:
delays one of the plurality of second decision data by one or more periods of the reception clock and output resulting data as delay data; and
decides whether or not the delay data and another one of the plurality of second decision data coincide with each other.

16. A signal reproduction method, comprising:
reproducing a first reception clock from a reception data signal;
fetching a second reception data signal in response to a variation edge of the reception clock and outputting the fetched reception data signal as first decision data;
fetching a third reception data signal in response to the variation edge of the reception clock in a plurality of periods immediately before the reception data signal is fetched and outputting the fetched reception data signal as a plurality of second decision data;
deciding whether the plurality of second decision data are different from each other; and
adjusting a phase of the variation edge of the reception clock based on a result of a decision.

17. The signal reproduction method according to claim 16, wherein the variation edge of the reception clock is delayed when the plurality of periods are two periods and the plurality of second decision data have values equal to each other.

18. The signal reproduction method according to claim 17, wherein the variation edge of the reception clock is further delayed when the plurality of periods are three periods and the plurality of second decision data have values equal to each other.

19. The signal reproduction method according to claim 16, wherein the variation edge of the reception clock is maintained when the plurality of periods are two periods and the plurality of second decision data have values different from each other.

20. The signal reproduction method according to claim 16, wherein one of the plurality of second decision data by one or more periods of the reception clock is delayed; and whether or not delayed data and another one of the plurality of second decision data coincide with each other is decided.

* * * * *